United States Patent
Sung et al.

(10) Patent No.: US 12,515,642 B2
(45) Date of Patent: Jan. 6, 2026

(54) VEHICLE AND CONTROL METHOD THEREOF

(71) Applicants: HYUNDAI MOTOR COMPANY, Seoul (KR); KIA CORPORATION, Seoul (KR)

(72) Inventors: Dong Hyun Sung, Hwaseong-si (KR); Dae Seok Jeon, Hwaseong-si (KR); Yongseok Kwon, Suwon-si (KR); Tae-Geun An, Gyeongsangbuk-do (KR); Hyoungjong Wi, Seoul (KR); Joon Ho Lee, Seoul (KR); Eungseo Kim, Gyeonggi-do (KR); Sangmin Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 277 days.

(21) Appl. No.: 18/077,505

(22) Filed: Dec. 8, 2022

(65) Prior Publication Data

US 2023/0227027 A1 Jul. 20, 2023

(30) Foreign Application Priority Data

Jan. 17, 2022 (KR) .......................... 10-2022-0006458

(51) Int. Cl.
| | |
|---|---|
| *B60W 30/09* | (2012.01) |
| *B60Q 9/00* | (2006.01) |
| *B60W 40/02* | (2006.01) |
| *G01S 13/86* | (2006.01) |

(52) U.S. Cl.
CPC ............ *B60W 30/09* (2013.01); *B60Q 9/008* (2013.01); *B60W 40/02* (2013.01); *G01S 13/865* (2013.01); *G01S 13/867* (2013.01); *B60W 2420/403* (2013.01); *B60W 2420/408* (2024.01); *B60W 2554/80* (2020.02)

(58) Field of Classification Search
CPC .... G01S 13/865; G01S 13/867; B60W 30/09; B60W 2420/403; B60Q 9/008
See application file for complete search history.

(56) References Cited

U.S. PATENT DOCUMENTS

| | | | |
|---|---|---|---|
| 2019/0016340 A1* | 1/2019 | Bae | B60W 30/18109 |
| 2020/0180635 A1* | 6/2020 | Hong | B62D 15/024 |
| 2022/0185268 A1* | 6/2022 | Yun | B60W 30/09 |
| 2022/0262129 A1* | 8/2022 | Cao | G01S 13/72 |
| 2022/0319328 A1* | 10/2022 | Zhang | G06V 20/56 |

FOREIGN PATENT DOCUMENTS

| | | | | |
|---|---|---|---|---|
| EP | 3835823 A1 * | 6/2021 | | G01S 13/931 |
| KR | 10-2018-0065585 A | 6/2018 | | |
| KR | 10-2018-0066524 A | 6/2018 | | |
| KR | 2022095358 A * | 7/2022 | | |

* cited by examiner

*Primary Examiner* — Toya Pettiegrew
(74) *Attorney, Agent, or Firm* — Morgan, Lewis & Bockius LLP

(57) ABSTRACT

A vehicle includes a front camera, a front radar, a corner radar, a corner LiDAR, and a controller configured to generate a first fusion mode by processing image data and radar data or to generate a second fusion mode by processing radar data and LiDAR data, wherein the controller changes the first fusion mode to the second fusion mode when the controller detects an abnormality of the front camera while performing avoidance control of the vehicle based on the first fusion mode, and performs the avoidance control based on the second fusion mode for a predetermined time period.

20 Claims, 9 Drawing Sheets

VEHICLE AND CONTROL METHOD THEREOF

CROSS-REFERENCE TO RELATED APPLICATION(S)

The present application claims priority to Korean Patent Application No. 10-2022-0006458, filed on Jan. 17, 2022, the entire contents of which is incorporated herein for all purposes by this reference.

BACKGROUND OF THE PRESENT DISCLOSURE

Field of the Present Disclosure

The present disclosure relates to a vehicle and a control method thereof, and more particularly, to a vehicle and a control method thereof configured for avoiding a collision using sensor fusion.

Description of Related Art

A vehicle is provided with an advanced driver assistance system (ADAS) to prevent various collisions with other vehicles while traveling on a road.

A premise for implementing the advanced driver assistance system is to recognize an external environment including an object, and this is achieved through a combination of various sensors such as a camera, a radar, and a Light Detection and Ranging (LiDAR). This is referred to as sensor fusion.

The vehicle may not be able to cope with the risk of a sudden collision by causing a temporary deterioration in recognition when a failure occurs in some of the sensors while traveling.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle and a control method thereof configured for avoidance control even in a situation in which the recognition of a camera deteriorates.

Additional aspects of the present disclosure will be set forth in part in the description which follows, and in part, will be obvious from the description, or may be learned by practice of the present disclosure.

In accordance with an aspect of the present disclosure, a vehicle includes a front camera provided in the vehicle to have a field of front view of the vehicle to obtain image data for detecting an object in the field of the front view, a front radar provided in the vehicle to have the field of the front view of the vehicle to obtain radar data for detecting the object in the field of the front view, a corner radar provided in the vehicle to have a field of a front side view of the vehicle to obtain the radar data for detecting the object in the field of the front side view, a corner LiDAR provided in the vehicle to have the field of the front side view of the vehicle to obtain LiDAR data for detecting the object in the field of the front side view, and a controller configured to generate a first fusion mode by processing the image data and the radar data or to generate a second fusion mode by processing the radar data and the LiDAR data, wherein the controller is configured to change the first fusion mode to the second fusion mode when the controller detects an abnormality of the front camera while performing avoidance control of the vehicle based on the first fusion mode, and performs the avoidance control based on the second fusion mode for a predetermined time period.

The controller may obtain a reliability of the first fusion mode, and determine that an abnormality has occurred in the front camera when the reliability of the first fusion mode is less than or equal to a threshold value.

The controller may be configured to determine the reliability of the first fusion mode based on a change in external illuminance of the front camera.

The controller may detect the change in the external illuminance when the vehicle enters a tunnel, and determine the reliability of the first fusion mode based on the change in the external illuminance.

The controller may detect the change in the external illuminance based on a number of external light sources, and determine the reliability of the first fusion mode based on the change in the external illuminance.

The controller may detect a change in the field of the front view based on external weather, and determine the reliability of the first fusion mode based on the field of the front view.

The controller may obtain the reliability of the first fusion mode for the predetermined time period, and change the second fusion mode to the first fusion mode when the reliability of the first fusion mode exceeds the threshold value within the predetermined time period.

The controller may obtain the reliability of the first fusion mode for the predetermined time period, and generate a system warning when the reliability of the first fusion mode is less than or equal to the threshold value within the predetermined time period.

The vehicle may further include a switch provided so that the controller is selectively connectable to any one of a first terminal and a second terminal of the switch, wherein the first terminal may electrically connect each of the front camera and the front radar, or the front camera and the corner radar to the controller, and the second terminal may electrically connect each of the corner LiDAR and the front radar, or each of the corner LiDAR and the corner radar to the controller.

The controller may be connected to the first terminal to generate the first fusion mode, and may be connected to the second terminal to generate the second fusion mode.

In accordance with an aspect of the present disclosure, a method of controlling a vehicle includes generating a first fusion mode by processing image data and radar data, generating a second fusion mode by processing radar data and LiDAR data, changing the first fusion mode to the second fusion mode when an abnormality is detected in a front camera while avoidance control is performed based on the first fusion mode, and performing the avoidance control based on the second fusion mode for a predetermined time period.

The changing of the first fusion mode to the second fusion mode may include obtaining a reliability of the first fusion mode, and concluding that an abnormality has occurred in the front camera when the reliability of the first fusion mode is less than or equal to a threshold value.

The determining that the abnormality has occurred in the camera may include determining the reliability of the first fusion mode based on a change in external illuminance of the front camera.

The determining that the abnormality has occurred in the camera may include detecting the change in the external illuminance when the vehicle enters a tunnel, and determining the reliability of the first fusion mode based on the change in the external illuminance.

The determining that the abnormality has occurred in the camera may include detecting the change in the external illuminance based on a number of external light sources, and determining the reliability of the first fusion mode based on the change in the external illuminance.

The determining that the abnormality has occurred in the camera may include detecting a change in the field of the front view based on external weather, and determining the reliability of the first fusion mode based on the field of the front view.

The control method may further include obtaining the reliability of the first fusion mode for the predetermined time period, and changing the second fusion mode to the first fusion mode when the reliability of the first fusion mode exceeds the threshold value within the predetermined time period.

The control method may further include obtaining the reliability of the first fusion mode for the predetermined time period, and generating a system warning when the reliability of the first fusion mode is less than or equal to the threshold value within the predetermined time period.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
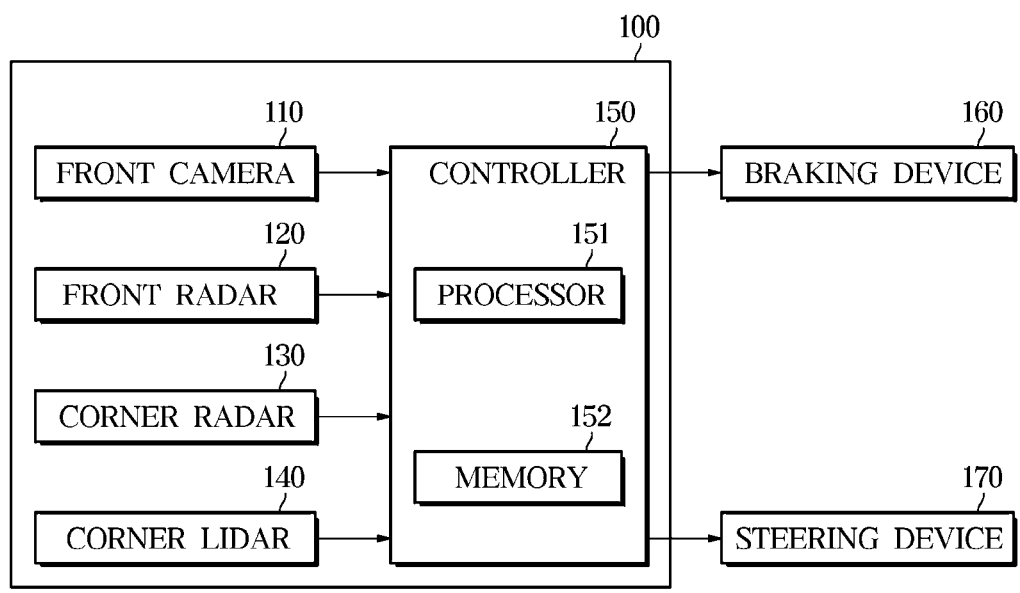
FIG. 1 illustrates a control block diagram of a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Throughout the specification, like reference numerals refer to like elements. The present specification does not describe all the elements of the embodiments, and duplicative contents between general contents or embodiments in the field of the present disclosure of the present disclosure will be omitted. The terms "portion," "module," "member," and "block" as used herein, may be implemented as software or hardware, and according to various exemplary embodiments of the present disclosure, a plurality of "portions," "modules," "members," or "blocks" may be implemented as a single component, or a single "portion," "module," "member," or "block" may include a plurality of components.

Throughout the specification, when a portion is "connected" to another portion, this includes the case in which the portion is indirectly connected to the other portion, as well as the case in which the portion is directly connected to the other portion, and the indirect connection includes a connection through a wireless communication network.

When a part "includes" a certain component, it means that other components may be further included, rather than excluding other components, unless otherwise stated.

In the present specification, it will also be understood that when an element is referred to as being "on" or "over" another element, it may be directly on the other element or intervening elements may also be present.

The terms first, second, etc. are used to distinguish one component from another component, and the component is not limited by the above-mentioned terms.

The singular expression includes the plural expression unless the context clearly dictates otherwise.

Identification numerals assigned to steps are used to identify the steps, the identification numerals do not indicate the order of the steps, and each step may be performed differently from the specified order unless the context clearly indicates a specific order.

Hereinafter, an operation principle and embodiments of the present disclosure will be described with reference to the accompanying drawings.

Figure 2:
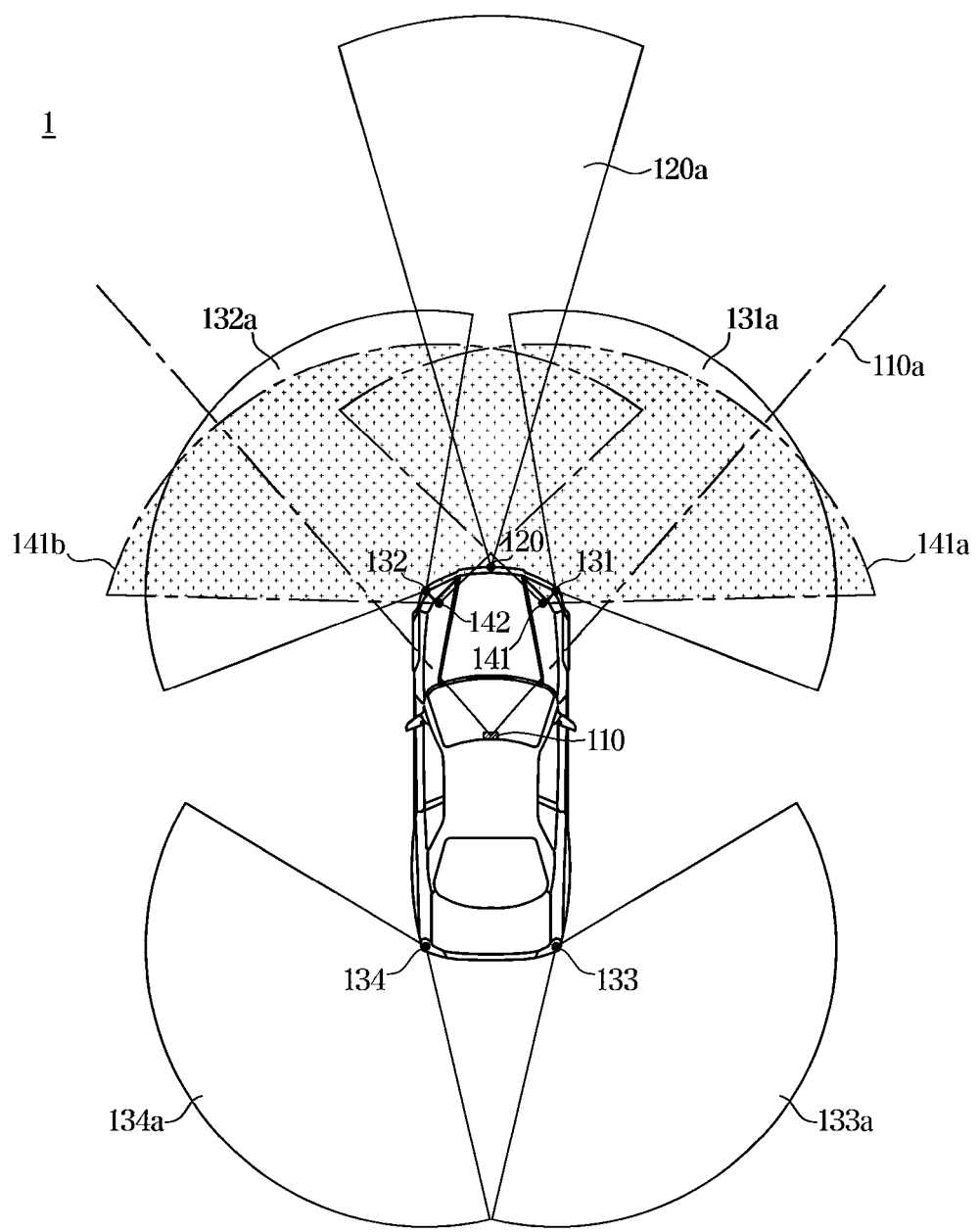
FIG. 2 illustrates detection areas of a front camera, a front radar, a corner radar, and a corner LiDAR included in the vehicle according to an exemplary embodiment of the present disclosure.

FIG. 1 illustrates a control block diagram of a vehicle according to an exemplary embodiment of the present disclosure, and FIG. 2 illustrates detection areas of a front camera, a front radar, a corner radar, and a corner LiDAR included in the vehicle according to an exemplary embodiment of the present disclosure.

The vehicle 1 includes an advanced driver assistance system 100, a braking device 160 and a steering device 170.

The braking device 160 may temporarily brake wheels of the vehicle 1 in response to a braking intention of a driver through a brake pedal and/or slip of the wheels and/or a data processing result of the advanced driver assistance system 100. When a required deceleration amount for avoiding a collision with an object is generated, a controller 150 may provide a control command for satisfying the required deceleration amount to the braking device 160.

The steering device 170 may temporarily or continuously control a traveling direction of the vehicle 1 in response to a steering intention of the driver through a steering wheel and/or a data processing result of the advanced driver assistance system 100. When an avoidance trajectory of the vehicle 1 is generated, the controller 150 may provide a driving current, a driving voltage, and a control command for moving according to the avoidance trajectory to the steering device 170 which is a steering actuator.

The advanced driver assistance system 100 may assist the driver to operate (drive, brake, and steer) the vehicle 1. For example, the advanced driver assistance system 100 may detect an environment around the vehicle 1 (e.g., another vehicle, a pedestrian, a cyclist, a lane, a road sign, or the like), and may control driving and/or braking and/or steering of the vehicle 1 in response to the detected environment. Hereinafter, the object includes all another vehicle, a cyclist, and the like, which are objects which may collide with the vehicle 1 traveling in the surrounding environment.

The controller 150 may transmit a driving control signal, a braking signal, and a steering signal to the braking device 160 and/or the steering device 170 through a vehicle communication network NT.

The advanced driver assistance system 100 may provide various functions to the driver. For example, the advanced driver assistance system 100 may provide lane departure warning (LDW), lane keeping assist (LKA), high beam assist (HBA), automatic emergency braking (AEB), traffic sign recognition (TSR), smart cruise control (SCC), blind spot detection (BSD), and the like. Furthermore, the driver assistance system 100 may provide highway driving pilot (HDP) for maintaining a lane of a vehicle traveling on a highway and controlling a speed of the vehicle, which are an autonomous driving level 3.

The advanced driver assistance system 100 may include at least one of a front camera 110, a front radar 120, a plurality of corner radars 130 (131, 132, 133, and 134), and a corner LiDAR 140.

The front camera 110 may include a front camera configured for securing a field of view 110a (see FIG. 2) facing the front of the vehicle 1 and a side camera for securing a field of view facing a side of the vehicle 1. In the instant case, the front camera may detect an object moving in a field of front view or an object traveling in an adjacent lane in a field of front side view.

The front camera 110 may be provided on a front windshield of the vehicle 1. The front camera may photograph the front of the vehicle 1 and obtain image data of the front of the vehicle 1. The image data of the front of the vehicle 1 may include location information on at least one of another vehicle, a pedestrian, a cyclist, a lane, a curb, a guard rail, a street tree, and a street light located in the front of the vehicle 1.

The front camera 110 obtains image data, so that the controller 150 processes the image data to detect an object included in the image data and to obtain motion information related to the object.

The front radar 120 may have a field of sensing 120a facing the front of the vehicle 1, The front radar 120 may be provided, fir example, on a grille or a bumper of the vehicle 1.

The front radar 120 may include a transmission antenna (or transmission antenna array) to radiate a transmitted radio wave toward the front of the vehicle 1, and a reception antenna (or reception antenna array) to receive a reflected radio wave reflected by an obstacle.

The front radar 120 may obtain front radar data from the transmitted radio wave transmitted by the transmission antenna and the reflected radio wave received by the reception antenna.

The front radar data may include location information and speed information related to an object located in the front of the vehicle 1, that is, another vehicle, a pedestrian, or a cyclist.

The front radar 120 may determine a relative distance to an obstacle based on a phase difference (or time difference) between the transmitted radio wave and the reflected radio wave, and may determine a relative speed of the obstacle based on a frequency difference between the transmitted radio wave and the reflected radio wave. The front radar 120 may transmit the front radar data to the controller 150.

The plurality of corner radars 130 include a first corner radar 131 provided on a front right side of the vehicle 1, a second corner radar 132 provided on a front left side of the vehicle 1, a third corner radar 133 provided on a rear right side of the vehicle 1, and a fourth corner radar 134 provided on a rear left side of the vehicle 1.

The first corner radar 131 may have a field of sensing 131a facing the front right side of the vehicle 1. The first corner radar 131 may be provided on a right side of a front bumper of the vehicle 1.

The second corner radar 132 may have a field of sensing 132a facing the front left side of the vehicle 1, and may be provided on a left side of the front bumper of the vehicle 1.

The third corner radar 133 may have a field of sensing 133a facing the rear right side of the vehicle 1, and may be provided on a right side of a rear bumper of the vehicle 1.

The fourth corner radar 134 may have a field of sensing 134a facing the rear left side of the vehicle 1, and may be provided on a left side of the rear bumper of the vehicle 1.

Each of the first, second, third, and fourth corner radars 131, 132, 133, and 134 may include a transmission antenna and a reception antenna.

The first, second, third, and fourth corner radars 131, 132, 133, and 134 may obtain first corner radar data, second corner radar data, third corner radar data, and fourth corner radar data, respectively.

The first corner radar data may include distance information and speed information related to an object located on the front right side of the vehicle 1.

The second corner radar data may include distance information and speed information related to an object located on the front left side of the vehicle 1.

The third and fourth corner radar data may include distance information and speed information related to objects located on the rear right side of the vehicle 1 and the rear left side of the vehicle 1.

The first, second, third, and fourth corner radars 131, 132, 133, and 134 may transmit the first, second, third, and fourth corner radar data to the controller 150, respectively.

The corner LiDAR 140 (141 and 142) may be provided in the vehicle 1 to have an external view of the vehicle 1. Fax example, the LiDAR 140 may be mounted on the front bumper, a radiator grille, a hood, a roof, a door, a side mirror, a tailgate, a trunk lid, or a fender.

The corner LiDAR 140 includes the first corner LiDAR 141 provided on the front right side of the vehicle 1 and the second corner LiDAR 142 provided on the front left side of the vehicle 1.

The corner LiDAR 140 may receive data for a lot of points on external surfaces of an object, and obtains point cloud data, which is a set of data for these points, and provides LiDAR data based on the point cloud data to the controller 150.

The controller 150 may process the image data of the front camera 110, the front radar data of the front radar 120, the corner radar data of the plurality of corner radars 130, and the LiDAR data of the corner LiDAR 140, and may generate a control signal for controlling the braking device 160 and/or the steering device 170.

The controller 150 may include an image signal processor, which is a processor 151 to process the image data of the front camera 110, and/or a digital signal processor to process the radar data of the radars 120 and 130 and/or a micro control unit (MCU) to generate a braking signal.

The controller 150 may perform image processing to recognize a lane of a road when the image information (i.e., image data) is received from the front camera 110 while an autonomous driving mode is performed, recognize the own lane in which the own vehicle travels based on location information of the recognized lane and determine whether opposite lanes of the own lane are all recognized, and control autonomous driving based on the recognized opposite lanes when it is determined that the opposite lanes are all recognized.

The controller 150 may identify objects in an image based on the image information obtained by the front camera 110 when a collision avoidance mode is performed, and may determine whether the objects in the image are fixed obstacles or moving obstacles by comparing information of the identified objects with the object information stored in the memory 152.

The controller 150 may detect obstacles in the front of the vehicle 1 (e.g., other vehicles, pedestrians, cyclists, curbs, guard rails, street trees, street lights, etc.) based on the image data of the front camera 110 and the front radar data of the front radar 120.

In addition to the front camera 110, the controller 150 may obtain information related to an object based on the LiDAR data of the corner LiDAR 140.

The memory 152 may store a program and/or data for processing image data, a program and/or data for processing radar data, and a program and/or data for the processor 151 to generate a braking signal and/or a warning signal.

The memory 152 may temporarily store the image data received from the front camera 110 and/or the radar data received from the radars 120 and 130, and may temporarily store a processing result of the image data and/or the radar data of the memory 152.

The memory 152 may be implemented as at least one of a non-volatile memory device such as a cache, a read only memory (ROM), a programmable ROM (PROM), an erasable programmable ROM (EPROM), an electrically erasable programmable ROM (EEPROM), and a flash memory, a volatile memory device such as a random access memory (RAM) and a Hard Disk Drive (HDD), and a storage medium such as a CD-ROM, but is not limited thereto.

The present disclosure may use sensor fusion to combine various sensors mounted on a vehicle, and use sensor fusion with different sensor combinations depending on driving situations. The vehicle may efficiently perform avoidance control by combining at least two sensors of the camera, the radar, and the LiDAR depending on the movement and driving situations of the vehicle. To the present end, the vehicle may preset various fusion modes depending on the sensor combination to avoid an object through conversion between the fusion modes even when the movement and driving situations are abruptly changed. Examples of predetermined fusion modes will be described with reference to FIG. 3, FIG. 4, FIG. 5 and FIG. 6.

Figure 3:
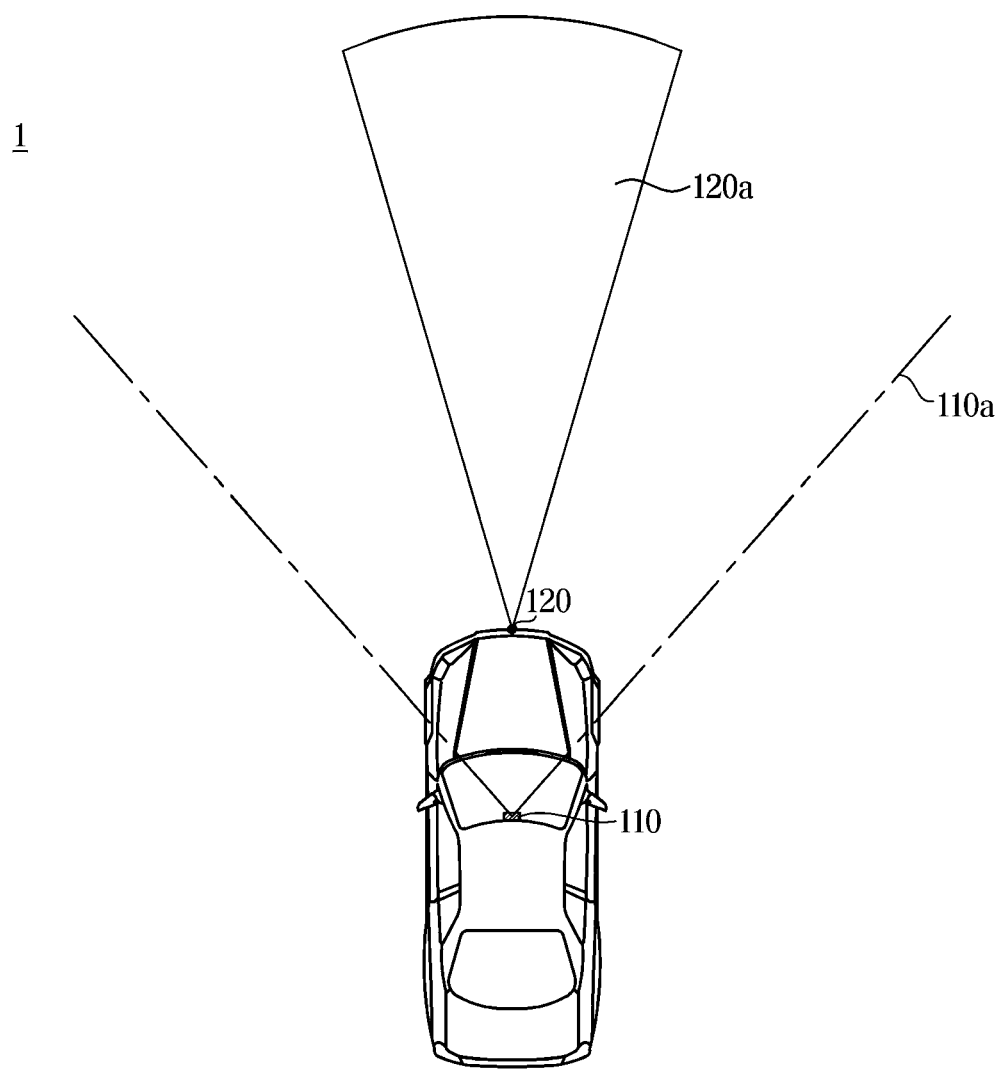
FIG. 3 and FIG. 4 illustrate detection areas in a first fusion mode of the vehicle according to an exemplary embodiment of the present disclosure.
Figure 4:
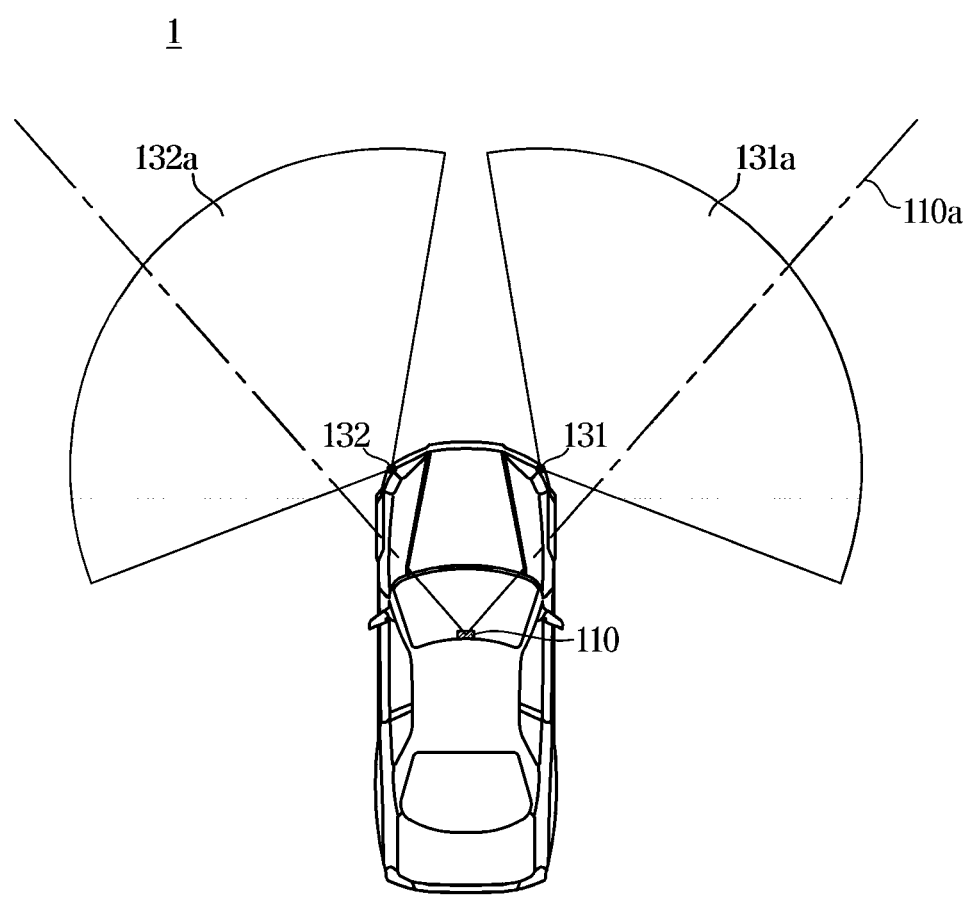

FIG. 3 and FIG. 4 illustrate detection areas in a first fusion mode of the vehicle according to an exemplary embodiment of the present disclosure.

In a first fusion mode, the image data and the radar data are integrated through fusion between the front camera 110 and the radars 120 and 130 to recognize an object and a surrounding environment. In the instant case, the vehicle 1 essentially utilizes the front camera 110, and may use any one of the front radar 120 and the corner radar 130 for sensor fusion.

FIG. 3 illustrates the first fusion mode, which is sensor fusion by the front camera 110 and the front radar 120. In the first fusion mode according to FIG. 3, the avoidance control is performed by integrating the front image data and the front radar data to increase a recognition accuracy for the field of front view rather than a field of side view. Because when traveling on a general road, the vehicle 1 may collide with an object stopped or an object traveling at a low speed in front, to focus on the field of front view, the vehicle 1 may perform the avoidance control based on the first fusion mode by the front camera 110 and the front radar 120.

On the other hand, because when the vehicle 1 is traveling on a highway or traveling on a road such as an intersection, the possibility of collision in the field of side view is higher than in the field of front view, the recognition accuracy for the field of side view may be increased through the front camera 110 and the corner radar 130.

FIG. 4 illustrates the first fusion mode, which is sensor fusion by the front camera 110 and the corner radar 130.

That is, the vehicle 1 may determine whether to use the front radar 120 for sensor fusion or the corner radar 130 for sensor fusion in the first fusion mode depending on the type of road on which vehicle 1 is currently traveling. The vehicle 1 according to various exemplary embodiments of the present disclosure may perform the avoidance control based on the first fusion mode (FIG. 3) in which the front radar 120 is included when the vehicle 1 is traveling at a speed below a predetermined speed based on the speed of the vehicle, and may perform the avoidance control based on the first fusion mode (FIG. 4) in which the corner radar 130 is included when the vehicle 1 is traveling at a speed exceeding the predetermined speed.

A camera used for sensor fusion has advantages of being easy to install, inexpensive, and configured for identifying the shape and color of an object by use of image processing. However, because the camera is affected by illuminance and contrast, it is difficult to exhibit normal performance in the evening, and it is difficult to secure a view in rain or fog. Furthermore, the camera has a disadvantage in that it is necessary to process a large amount of data as an image processing procedure is essential.

Therefore, the present disclosure may take immediate action through a method of changing from the first fusion mode including the front camera 110 to a second fusion mode including the corner LiDAR 120 when the recognition of the camera deteriorates.

To the present end, each of the front camera 110, the front radar 120, the corner radar 130, and the corner LiDAR 140 may be electrically connected to the processor 151 processing data, and may be connected through a switch to be immediately connected depending on a predetermined combination.

For example, the switch may include a first terminal and a second terminal to allow the front camera 110 and the front radar 120, or the front camera 110 and the corner radar 130 is electrically connected to the processor 151 through the first terminal, performing the avoidance control by the first fusion mode. Furthermore, the switch allows the corner LiDAR 140 and the front radar 120, or the corner LiDAR 140 and the corner radar 130 to be electrically connected to the processor 151 through the second terminal, performing the avoidance control by the second fusion mode.

The switch corresponds to a physical device that allows a selective connection by any one of the first terminal and the second terminal, and is configured to change an electrical connection between the first terminal and the second terminal depending on a control command of the controller 150.

Figure 5:
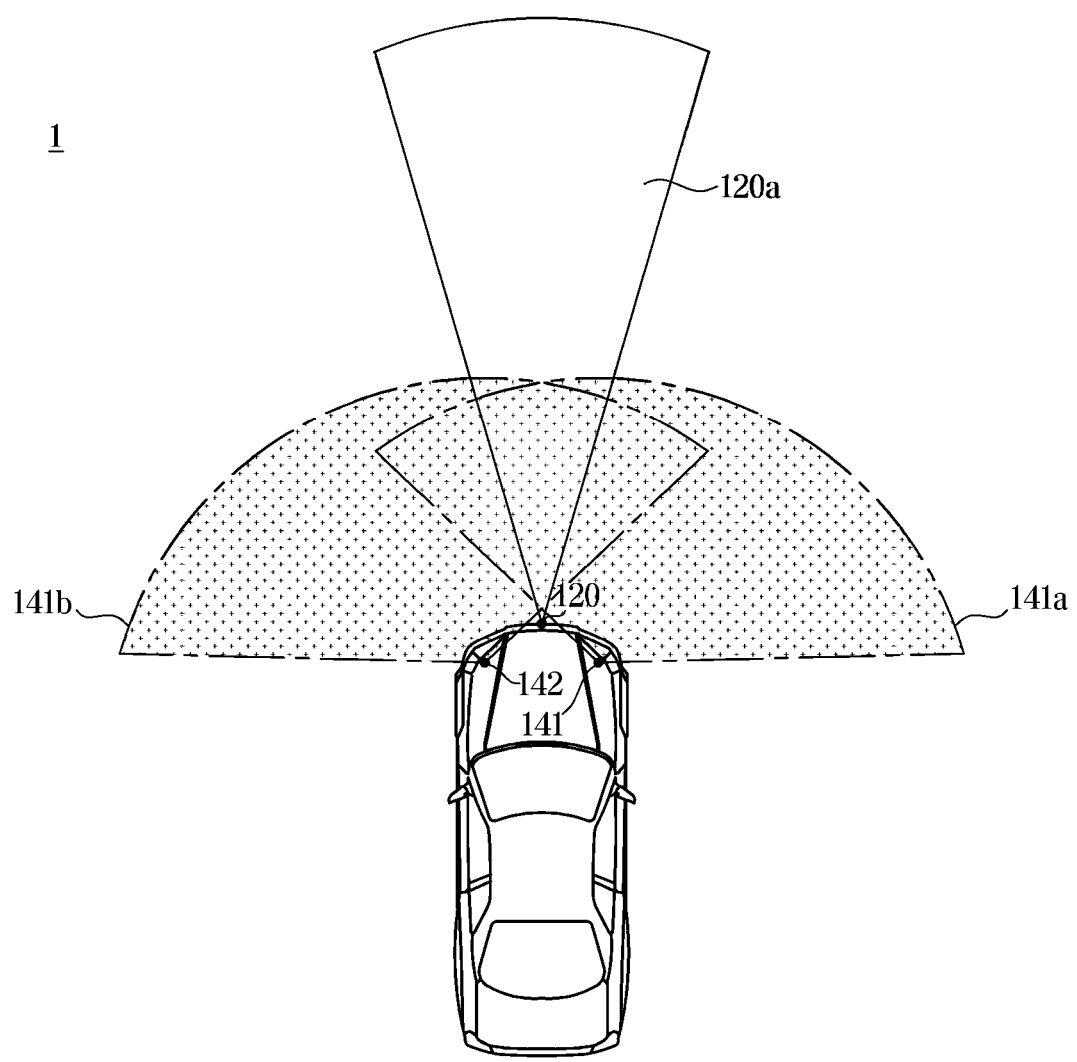
FIG. 5 and FIG. 6 illustrate detection areas in a second fusion mode of the vehicle according to an exemplary embodiment of the present disclosure.
Figure 6:
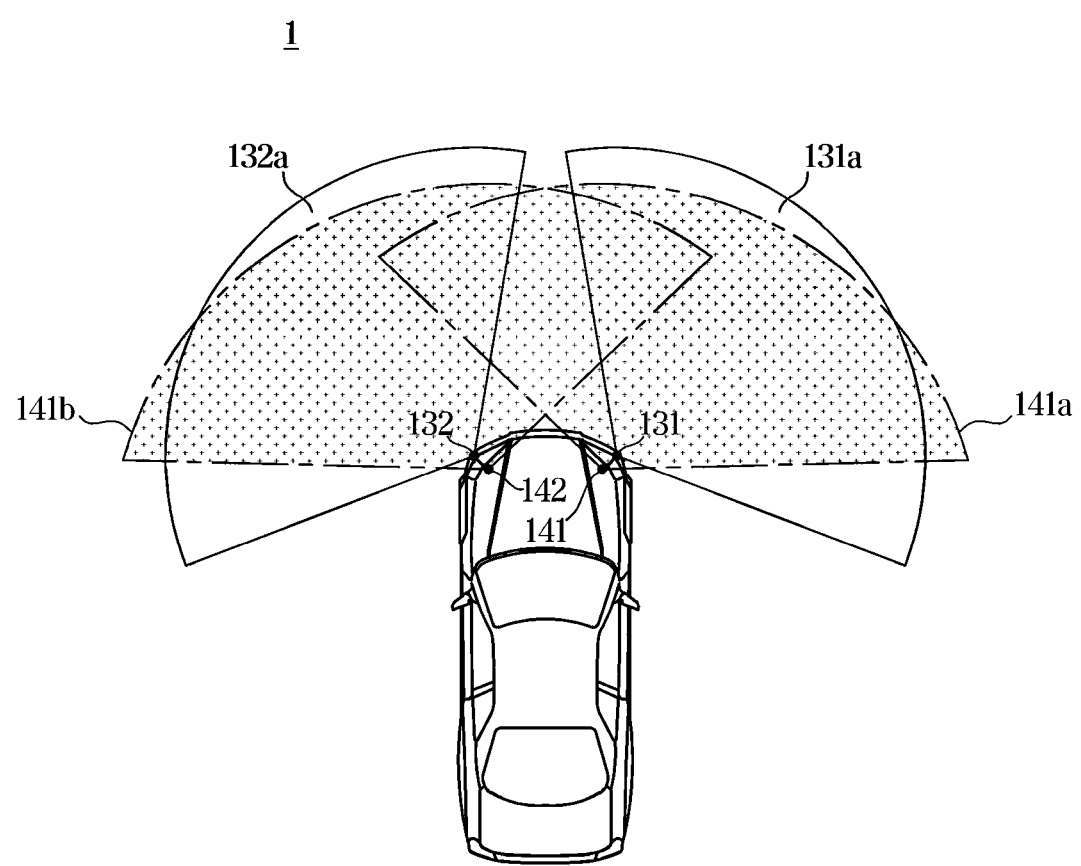

FIG. 5 and FIG. 6 illustrate detection areas in the second fusion mode of the vehicle according to an exemplary embodiment of the present disclosure.

FIG. 5 illustrates the second fusion mode, which is sensor fusion by the front radar 120 and the corner LiDAR 140. In the second fusion mode according to FIG. 5, the avoidance control is performed by integrating the front radar data and the side LiDAR data to increase the recognition accuracy for the field of front view rather than the field of side view. Because when traveling on a general road, the vehicle 1 may collide with an object stopped or an object traveling at a low speed in front, to focus on the field of front view, the vehicle 1 may perform the avoidance control based on the second fusion mode by the front radar 120 and the corner LiDAR 140.

On the other hand, because when the vehicle 1 is traveling on a highway or traveling on a road such as an intersection, the possibility of collision in the field of side view is higher than in the field of front view, the recognition accuracy for the field of side view may be increased through the corner radar 130 and the corner LiDAR 140.

FIG. 6 illustrates the second fusion mode, which is sensor fusion by the corner radar 130 and the corner LiDAR 140.

That is, the vehicle 1 may determine whether to use the front radar 120 for sensor fusion or the corner radar 130 for sensor fusion in the second fusion mode depending on the type of road on which vehicle 1 is currently traveling. The vehicle 1 according to various exemplary embodiments of the present disclosure may perform the avoidance control based on the second fusion mode (FIG. 5) in which the front radar 120 is included when the vehicle 1 is traveling at a speed below a predetermined speed based on the speed of the vehicle, and may perform the avoidance control based on the second fusion mode (FIG. 6) in which the corner radar 130 is included when the vehicle 1 is traveling at a speed exceeding the predetermined speed.

The configuration and basic premise for implementing the processor according to the present disclosure have been described above. Hereinafter, embodiments of a control method based on the above-described first fusion mode and second fusion mode will be described.

Figure 7:
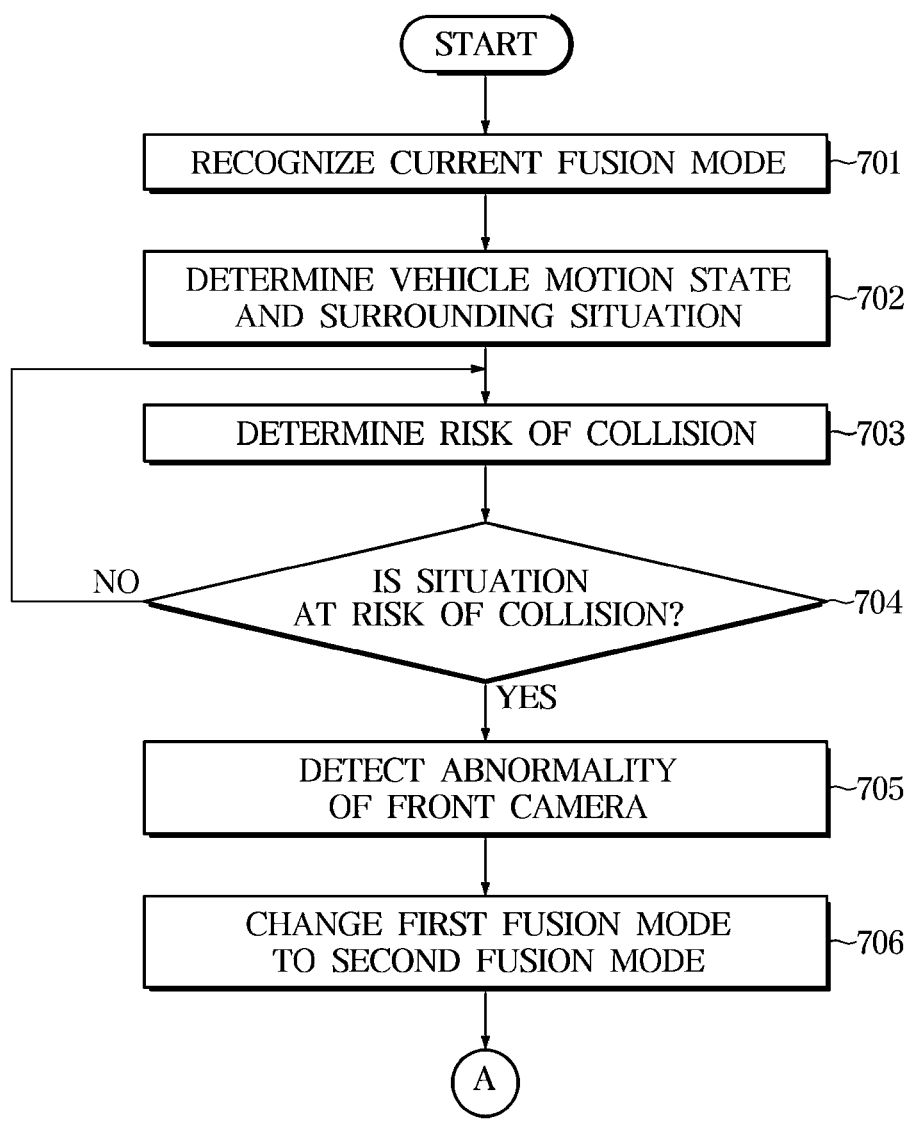
FIG. 7 and FIG. 8 are flowcharts of a vehicle control method according to an exemplary embodiment of the present disclosure.
Figure 8:
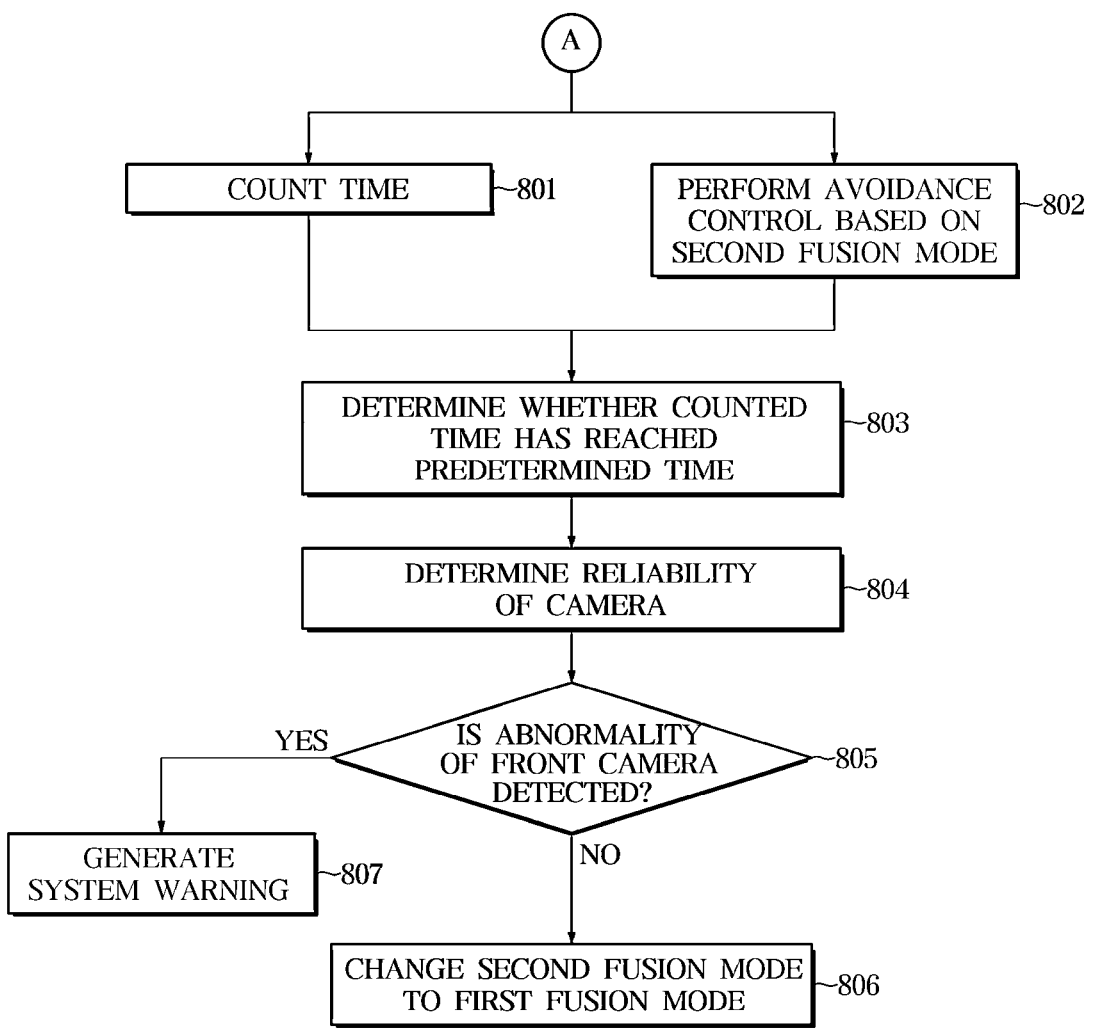

FIG. 7 and FIG. 8 are flowcharts of a vehicle control method according to an exemplary embodiment of the present disclosure.

Referring to FIG. 7, the controller 150 recognizes a current fusion mode (701). The controller 150 determines by which mode of the first fusion mode and the second fusion mode the avoidance control is being performed by checking a terminal state of the switch connecting the processor 151 and various sensors. Hereinafter, embodiments will be described on the as that the first fusion mode is being performed.

The controller 150 determines a vehicle motion state and a surrounding situation (702). The controller 150 determines which sensor of the front radar 120 and the corner radar 130 to use in the first fusion mode by obtaining speed information in the vehicle motion state. The controller 150 may perform the avoidance control based on the first fusion mode in which the front radar 120 is included when the vehicle 1 is traveling at a speed below the predetermined speed, and may perform the avoidance control based on the first fusion mode in which the corner radar 130 is included when the vehicle 1 is traveling at a speed exceeding the predetermined speed.

Also, the controller 150 may perform the avoidance control based on the first fusion mode in which the corner radar 130 is included in a situation in which the vehicle 1 has a high probability of colliding with an object in a lateral direction, such as at an intersection and a highway, in relation to the surrounding situation.

The controller 150 determines a risk of collision with the object (703), and when it is determined that the vehicle 1 is when there is a possibility of a collision (704), detects an abnormality of the front camera (705). The present step is a step of checking a deterioration in recognition of the front camera 110 before changing to the second fusion mode to prevent in advance the avoidance control based on misrecognition by the first fusion mode.

The controller 150 changes the first fusion mode to the second fusion mode when the recognition of the front camera 110 deteriorates (706). The controller 150 may change the fusion mode through switching control connecting the processor 151 and the sensors. For example, the controller 150 may control the switch so that electrical connection with the sensor is made from the first terminal to the second terminal.

The controller 150 according to various exemplary embodiments of the present disclosure may change the first fusion mode to the second fusion mode when the abnormality of the front camera 110 is detected while the vehicle 1 is performing the avoidance control based on the first fusion mode, and may perform the avoidance control based on the second fusion mode for a predetermined time period.

Referring to FIG. 8, when the second fusion mode is performed, the controller 150 counts the time from when the second fusion mode is started (801), and performs the avoidance control based on the second fusion mode (802). That is, the vehicle 1 performs the avoidance control through sensor fusion with the radars 120 and 130 and the corner LiDAR 140. In the instant case, the avoidance control includes any one of a braking control and a steering control.

The controller 150 determines whether the counted time has reached the predetermined time period (803), and determines reliability of the front camera 110 (804). The controller 150 may obtain reliability of the first fusion mode, that is, the reliability of the front camera 110, and determine that an abnormality has occurred in the front camera 110 when a reliability value of the first fusion mode is less than or equal to a threshold value.

Figure 9:
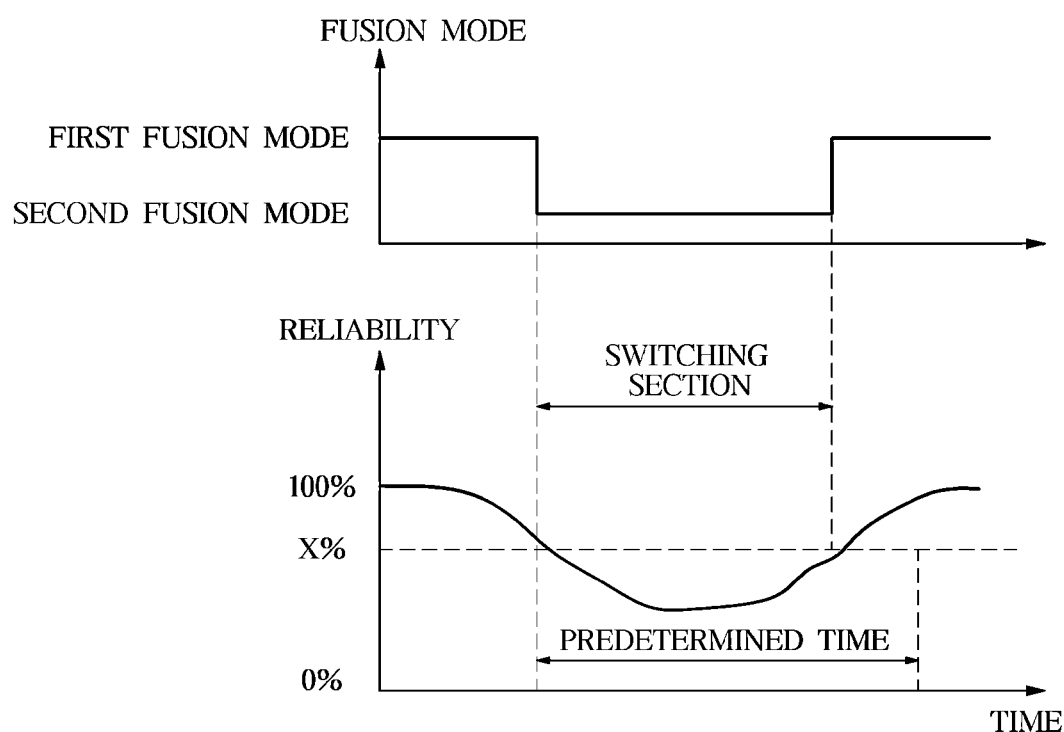
FIG. 9 illustrates an example of conversion between fusion modes.

Referring to FIG. 9, the controller 150 starts counting in a switching section, which is in a state of being switched from the first fusion mode to the second fusion mode, continuously measures the reliability of the first fusion mode for the predetermined time period, and switches to the first fusion mode again when the reliability exceeds the threshold value when the predetermined time period has elapsed.

The vehicle 1 may form a combination of two sensor fusions, and discover a deterioration in performance of a specific sensor through real-time comparison between the first fusion mode and the second fusion mode. That is, the vehicle 1 may perform a normal avoidance control even when there is an abnormality in a specific fusion mode by providing a preliminary sensor fusion mode, and may switch to a main fusion mode when a recognition deterioration due to an external environment does not occur to reduce an operation amount of processing of sensor data while preventing misrecognition.

In an exemplary embodiment of the present disclosure, the reliability may be determined depending on the characteristics of the sensor itself and the external environment. For example, the reliability of the front camera 110 may decrease due to a defect in the sensor itself. Also, the reliability of the front camera 110 may be determined based on a change in external illuminance. For example, in the evening when the illumination is low, the reliability of the first fusion mode may decrease, and in the daytime when the illumination is high, the reliability of the first fusion mode may increase. Also, because when the vehicle 1 enters a tunnel, the illuminance therein is lowered than the illuminance outside, the reliability of the first fusion mode may decrease. In the instant case, the controller 150 may detect a change in illuminance when the vehicle 1 enters the tunnel, and determine the reliability of the first fusion mode based on the change in illuminance.

Also, the controller 150 may detect the change in illuminance based on the number of external light sources and determine the reliability of the first fusion mode based on the change in illuminance. For example, the reliability of the first fusion mode may be determined based on a street light detected from the field of front view in a dark evening environment. When there are many light sources outside, a high reliability will be determined.

Also, the controller 150 may detect a change in the field of front view based on external weather and determine the reliability of the first fusion mode based on the field of front view.

As described above, as a result of determining the reliability of the first fusion mode, when the abnormality of the front camera 110 is continuously detected (805), the controller 150 generates a control signal to generate a system warning (807). In the instant case, because the deterioration in the performance of the front camera 110 is not due to an external factor, but due to the defect of the front camera 110 itself, the controller 150 may provide a warning about this to the driver to induce the driver to recover a control right.

When the abnormality of the front camera 110 is not detected, the controller 150 changes the second fusion mode to the first fusion mode (806).

The controller 150 according to various exemplary embodiments of the present disclosure may obtain the reliability of the first fusion mode for the predetermined time period, and change the second fusion mode to the first fusion mode when the reliability of the first fusion mode exceeds the threshold value within the predetermined time period.

The controller 150 according to another exemplary embodiment of the present disclosure may obtain the reliability of the first fusion mode for the predetermined time period, and generate a system warning when the reliability of the first fusion mode is less than or equal to the threshold value within the predetermined time period.

As is apparent from the above, according to an aspect of the present disclosure, it is possible to cope with the risk of collision in various situations by replacing a camera with another sensor even when a deterioration in recognition of the camera occurs.

The disclosed embodiments may be implemented in the form of a recording medium storing instructions executable by a computer. The instructions may be stored in the form of program code, and when executed by a processor, a program module may be created to perform the operations of the disclosed embodiments. The recording medium may be implemented as a computer-readable recording medium.

The computer-readable recording medium includes any type of recording medium in which instructions readable by the computer are stored. For example, the recording medium may include a read only memory (ROM), a random access memory (RAM), a magnetic tape, a magnetic disk, a flash memory, an optical data storage device, and the like.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle comprising:
   a front camera provided in the vehicle to have a field of front view of the vehicle to obtain image data for detecting an object in the field of the front view;
   a front radar provided in the vehicle to have the field of the front view of the vehicle to obtain first radar data for detecting the object in the field of the front view;
   a corner radar provided in the vehicle to have a field of a front side view of the vehicle to obtain second radar data for detecting the object in the field of the front side view;
   a corner Light Detection and Ranging (LiDAR) provided in the vehicle to have the field of the front side view of the vehicle to obtain LiDAR data for detecting the object in the field of the front side view; and
   a controller configured to:
   generate a first fusion mode by processing the image data, the first radar data and the second radar data or to generate a second fusion mode by processing the first radar data, the second radar data and the LiDAR data;
   utilize the front radar in the first fusion mode when a speed of the vehicle is a predetermined speed or less;

utilize the corner radar in the first fusion mode when the speed of the vehicle exceeds the predetermined speed;

change the first fusion mode to the second fusion mode when the controller detects an abnormality of the front camera while performing avoidance control of the vehicle based on the first fusion mode; and perform the avoidance control based on the second fusion mode for a predetermined time period.

2. The vehicle of claim 1, wherein the controller is configured to obtain a reliability of the first fusion mode, and to conclude that the abnormality has occurred in the front camera when the reliability of the first fusion mode is less than or equal to a threshold value.

3. The vehicle of claim 2, wherein the controller is configured to determine the reliability of the first fusion mode based on a change in external illuminance of the front camera.

4. The vehicle of claim 3, wherein the controller is configured to detect the change in the external illuminance when the vehicle enters a tunnel, and to determine the reliability of the first fusion mode based on the change in the external illuminance.

5. The vehicle of claim 3, wherein the controller is configured to detect the change in the external illuminance based on a number of external light sources, and to determine the reliability of the first fusion mode based on the change in the external illuminance.

6. The vehicle of claim 3, wherein the controller is configured to detect a change in the field of the front view based on external weather, and to determine the reliability of the first fusion mode based on the field of the front view.

7. The vehicle of claim 2, wherein the controller is configured to obtain the reliability of the first fusion mode for the predetermined time period, and to change the second fusion mode to the first fusion mode when the reliability of the first fusion mode exceeds the threshold value within the predetermined time period.

8. The vehicle of claim 2, wherein the controller is configured to obtain the reliability of the first fusion mode for the predetermined time period, and to generate a system warning when the reliability of the first fusion mode is less than or equal to the threshold value within the predetermined time period.

9. The vehicle of claim 1, further including:
a switch provided so that the controller is selectively connectable to one of a first terminal and a second terminal of the switch, wherein the first terminal electrically connects each of the front camera and the front radar, or the front camera and the corner radar to the controller, and wherein the second terminal electrically connects each of the corner LiDAR and the front radar, or each of the corner LiDAR and the corner radar to the controller.

10. The vehicle of claim 9, wherein the controller is connected to the first terminal to generate the first fusion mode, and is connected to the second terminal to generate the second fusion mode.

11. The vehicle of claim 1, wherein the controller is configured to determine a risk of collision with the object, and when the controller concludes that the vehicle is in a possibility of the collision, the controller is configured to detect the abnormality of the front camera.

12. A method of controlling a vehicle, the method comprising:
generating, by a controller of the vehicle, a first fusion mode by processing image data and radar data;

utilizing, by the controller, a front radar in the first fusion mode when a speed of the vehicle is a predetermined speed or less;

utilizing, by the controller, a corner radar in the first fusion mode when the speed of the vehicle exceeds the predetermined speed;

generating, by the controller, a second fusion mode by processing the radar data and LiDAR data;

changing, by the controller, the first fusion mode to the second fusion mode when an abnormality of a front camera is detected while avoidance control is performed based on the first fusion mode; and performing, by the controller, the avoidance control based on the second fusion mode for a predetermined time period.

13. The method of claim 12, wherein the changing of the first fusion mode to the second fusion mode includes obtaining a reliability of the first fusion mode, and concluding that the abnormality has occurred in the front camera when the reliability of the first fusion mode is less than or equal to a threshold value.

14. The method of claim 13, wherein the concluding that the abnormality has occurred in the front camera includes determining the reliability of the first fusion mode based on a change in external illuminance of the front camera.

15. The method of claim 14, wherein the concluding that the abnormality has occurred in the front camera includes detecting the change in the external illuminance when the vehicle enters a tunnel, and determining the reliability of the first fusion mode based on the change in the external illuminance.

16. The method of claim 14, wherein the concluding that the abnormality has occurred in the front camera includes detecting the change in the external illuminance based on a number of external light sources, and determining the reliability of the first fusion mode based on the change in the external illuminance.

17. The method of claim 14, wherein the concluding that the abnormality has occurred in the front camera includes detecting a change in a field of a front view based on external weather, and determining the reliability of the first fusion mode based on the field of the front view.

18. The method of claim 13, further including:
obtaining the reliability of the first fusion mode for the predetermined time period; and changing the second fusion mode to the first fusion mode when the reliability of the first fusion mode exceeds the threshold value within the predetermined time period.

19. The method of claim 13, further including:
obtaining the reliability of the first fusion mode for the predetermined time period; and generating a system warning when the reliability of the first fusion mode is less than or equal to the threshold value within the predetermined time period.

20. The method of claim 12, wherein the controller is configured to determine a risk of collision with the object, and when the controller concludes that the vehicle is in a possibility of the collision, the controller is configured to detect the abnormality of the front camera.

* * * * *